United States Patent [19]

Ito et al.

[11] 4,332,995

[45] Jun. 1, 1982

[54] ELECTRICAL DISCHARGE MACHINE

[75] Inventors: Tetsuro Ito; Toshiro Oizumi; Shigeo Yamada, all of Nagoya, Japan

[73] Assignee: Mitsubishi Denki Kabushiki Kaisha, Tokyo, Japan

[21] Appl. No.: 176,432

[22] Filed: Aug. 8, 1980

[30] Foreign Application Priority Data

Aug. 9, 1979 [JP] Japan .................. 54/101600
Oct. 11, 1979 [JP] Japan .................. 54/131025

[51] Int. Cl.$^3$ .............................................. B23P 1/02
[52] U.S. Cl. ................................ 219/69 V; 219/69 C
[58] Field of Search ................ 219/69 V, 69 C, 69 R, 219/69 M

[56] References Cited

U.S. PATENT DOCUMENTS 4,168,426  9/1979  Furukawa ...................... 219/69 V
4,247,749  1/1981  Wavre ........................... 219/69 V

*Primary Examiner*—C. C. Shaw

*Attorney, Agent, or Firm*—Sughrue, Mion, Zinn, Macpeak and Seas

[57] ABSTRACT

An electrical discharge machine control device which controls the displacement of the relative positions of a machining electrode and a workpiece so that the relative positions of the electrode and workpiece are changed not only in the main direction in which the workpiece is machined with the electrode but also in a plane perpendicular to the Z-axis without rotating the electrode while a predetermined machining discharge gap is maintained between the electrode and the workpiece. The relative displacement in the perpendicular plane is displayed at an enlarged scale on an X–Y display device which may be a cathode-ray tube with the center of the displacement maintained at a predetermined origin point. An optical encoder detects the movement in the X–Y plane to provide a detection signal. The detection signal is applied through reversible counters to the horizontal and vertical deflection amplifiers of the display device.

10 Claims, 12 Drawing Figures

$$\begin{cases} |\vec{a}| = \dfrac{R}{\sin\dfrac{\theta_1}{2}}, & \angle\vec{a} = \theta_2 - \dfrac{\theta_1}{2} \\ |\vec{b}| = \dfrac{R}{\sin\dfrac{\theta_2}{2}}, & \angle\vec{b} = \pi - \dfrac{\theta_2}{2} \\ |\vec{c}| = \dfrac{R}{\sin\dfrac{\theta_3}{2}}, & \angle\vec{c} = -\dfrac{\theta_3}{2} \end{cases}$$

ELECTRICAL DISCHARGE MACHINE

BACKGROUND OF THE INVENTION

The present invention relates to electrical discharge machining methods and apparatus. More particularly, the invention relates to an improved electrical discharge machining method in which, while an electrical tool is moved relative to a workpiece in a primary machining direction, hereinafter referred to as "a Z-axis," the electrode tool is also moved in a plane perpendicular to the Z-axis, hereinafter referred to as "X-Y plane," to effect an electrical discharge machining operation between the electrode tool and the workpiece, that is, to machine the workpiece using electrical discharge, and to an apparatus for practicing the method.

An electrical discharge machining method in which a workpiece is machined with an electrode tool by a primary machining movement in the Z-axis direction and an auxiliary machining movement in the X-Y plane is well known in the art. Such a method is disclosed, for example, in Published Japanese patent application No. 3594/1966. The conventional method is advantageous in that a plurality of machining steps, namely, a coarse machining step, an intermediate machining step, an intermediate finish machining step, a finish machining step and a fine finish machining step can be continuously carried out with a single tool electrode.

In general, in the coarse machining steps, a primary machining movement in the Z-axis direction is utilized and the workpiece is machined with large current as a result of which the amount of material removed from the workpiece, that is, the "machining width" is relatively large. On the other hand, in the remaining machining steps up to the fine finish machining step, the discharge current is gradually decreased and the machining width is therefore decreased. In these machining steps, the above-described auxiliary machining movement in the X-Y plane makes the machined surface flat and smooth while correcting for the decrease of the machining width with the single electrode tool.

In a conventional electrical discharge machine having an auxiliary machining movement capability, chips of workpieces and denatured components of an insulating machining liquid which had been thermally decomposed by high temperature arcs during electrical discharge which may accumulate in a discharge gap can be removed by the pumping action of the machining liquid due to the auxiliary machining movement to therefore provide the machined surface with a suitable smoothness.

FIG. 1 shows a general machining state produced with the use of the conventional method in which a workpiece 12 is machined with an electrode having a scalene triangle section. An auxiliary machining movement in the X-Y plane is imparted to the electrode 10. That is, the electrode 10 is subjected to an orbital or circular motion. The radius of the circular motion is indicated by R in FIG. 1. This conventional method can provide the same effect as that in the case where an electrode larger by the radius R than the electrode 10 is used. However, the conventional method is still disadvantageous in the following points. As is apparent from FIG. 1, the corners are machined into arcs with a radius R. That is, as the machining configuration is extremely different from the configuration of the electrode 10, it is impossible with the conventional method to carry out electrical discharge machining operation with a very high accuracy.

A variety of auxiliary machining feeding methods have been proposed in order to eliminate the difficulties accompanying circular motion. One of these auxiliary machining feeding methods is illustrated in FIG. 2 in which an electrode 10 is displaced relative to a workpiece 12 equidistantly and radially towards the corners. In FIG. 2, the radial displacements towards the corners are indicated by vectors $\vec{a}$, $\vec{b}$ and $\vec{c}$ each having a magnitude R. However, as is clear from FIG. 2, the machined configuration is considerably different from the configuration of the electrode 10 because of the resulting corner angles even if the radial relative displacements are carried out according to the conventional method. That is, it is still impossible for the conventional method to provide highly accurate electrical discharge machining.

Another conventional auxiliary machining feeding method is illustrated in FIG. 3 which is an improvement of the method of FIG. 2. In the method of FIG. 3, the sides A, B and C of a triangular electrode are moved relative to the workpiece with a similarity scale factor k. However, this method is still disadvantageous in that, except for the case where the electrode 10 is a regular triangle in section, the machining widths $\alpha$, $\beta$ and $\gamma$ between the workpiece 12 and the electrode 10 are different from one another and therefore the machining configuration produced does not correspond to the configuration of the electrode 10. In other words, in the conventional method of FIG. 3, the widths $\alpha$, $\beta$ and $\gamma$, which are enlarged because of the auxiliary machining movement from the actual configuration of the electrode, are different from one another depending on the configuration of the sides. Accordingly, uniformly machined surfaces cannot be obtained by a plurality of electric discharge machining steps from the coarse machining step to the fine machining steps. That is, the machined surfaces are not sufficiently high in surface flatness.

An improved electrical discharge machining method the invention will initially be described with reference to FIG. 4 which illustrates an auxiliary machining movement operation. In FIG. 4, the machining configuration produced by an electrode 10 is indicated by straight lines A', B' and C' which are parallel to the corresponding sides of the electrode 10 and are spaced by a distance R from the corresponding sides of the electrode 10. The straight lines A', B' and C' cross one another at points $P_1$, $P_2$ and $P_3$, respectively. The electrode 10 has vertices $q_1$, $q_2$ and $q_3$ and angles $\theta_1$, $\theta_2$ and $\theta_3$.

Among auxiliary machining movement vectors $\vec{a}$, $\vec{b}$ and $\vec{c}$ for moving the sides A, B and C of the electrode 10 outwardly by equal distances R, the vector $\vec{a}$ will be described by way of example. The lines A' and B' include the intersections $r_2$ and $r_1$ which are obtained by drawing perpendiculars of length R from the vertex $q_1$ to the lines A' and B', respectively. The rectangle $P_1 r_2 q_1 r_1$ is a square. When the vertex $q_1$ is displaced by the length of the vector $\vec{a}$, the vertex $q_2$ is moved to a point $q_2'$. The angle at the vertex $q_2$ of the parallelogram $P_1 q_1 q_2 q_2'$ is $\theta_1/2$. Therefore, the vector $\vec{a}$ has an azimuth of $\theta_2 + \theta_1/2$ and a magnitude of $R/\sin(\theta_1/2)$. By similar calculations, the other displacement vectors $\vec{b}$ and $\vec{c}$ have azimuths and magnitudes as indicated in FIG. 5. If the relative displacement of the electrode 10 and the workpiece 12 is effected by auxiliary machining movement in the X-Y plane according to the vectors $\vec{a}$, $\vec{b}$ and $\vec{c}$, then a satisfactory machining configuration is obtained which is in conformance with the configuration of the electrode 10, specifically with the angular configuration corresponding to that of the electrode.

FIG. 6 shows continuous vectors, auxiliary machining movement vectors, which are obtained by conversion of the vectors $\vec{a}$, $\vec{b}$ and $\vec{c}$. In this case, a desired machining configuration can be obtained by providing relative displacements according to the vectors in FIG. 6 to the electrode 10 and the workpiece 12. However, it should be noted that, in practice, a considerably complex technique is required for implementing the above-described vector calculations and for controlling the locus of the electrode tool according to the vector calculation due to the following reasons. The configuration of the electrode 10 is not always limited to the above-described triangle and is often more intricate. In the case of an electrode of intricate configuration, the above-described vector calculation and locus control can be achieved only by a so-called "N/C control" technique which requires a great amount of complex calculation equipment and/or computer programs to implement.

In a practical electrical discharge machining operation, the discharge gap is 10 to 100 μm and the electrode tends to be consumed unevenly in dependence upon its configuration. Therefore, the displacement vectors are determined by the angles, thickness and area of the electrode instead of solely by vector calculation. In most cases, the displacement vectors are determined graphically.

The invention further relates to an electrical discharge machining control device which operates to control the displacement of the relative position of an electrode and a workpiece so that the relative positions of the electrode and workpiece are changed not only in the main direction in which the workpiece is machined with the electrode but also in a plane perpendicular to the Z-axis without rotating the electrode while a predetermined machining discharge gap of typically 10 to 100 μm is maintained between the electrode and the workpiece.

As disclosed in the above-mentioned Japanese patent application No. 3594/1966 as to relative displacement of the electrode and the workpiece in the X-Y plane, the electrode is moved along a revolving orbit or a star-shaped orbit (radial motion) so that the workpiece is machined to a larger or smaller size compared with the size of the electrode. The relative displacement value in these machining operations is considerably small, typically only 50 to 500 μm, corresponding to a so-called "finish margin".

Recently, an N/C (numerical controller) device has been employed to provide such an orbit or locus as described above for the movement of the electrode and the workpiece wherein the workpiece is automatically machined by controlling the movement of a table on which the workpiece is mounted or the movement of a head on which the electrode is mounted in the X-Y plane. In such an N/C device, a desired locus is programmed on a paper tape in advance which is loaded into the N/C device. The coincidence of the programmed locus with the desired locus may be checked by moving the table without actually machining the workpiece. However, it is considerably difficult to visually confirm whether or not the programmed locus coincides with the desired locus because the amount of relative displacement is very small as described above. After the machining of the workpiece has been started, it is substantially impossible to confirm the locus. Accordingly, the acceptability of machining conditions can be determined only after the machining operation has been completed.

Accordingly, a further object of the invention is to provide an electrical discharge machining control device in which a small displacement locus is enlarged so as to be visually checked and two-dimensional movement in the X-Y plane of the electrode and workpiece is displayed on a display unit such as a cathode-ray tube.

SUMMARY OF THE INVENTION

In view of the foregoing, an object of this invention is to provide an electrical discharge machine in which desired displacement vectors are indicated on a display means in which an auxiliary machining plane of movement is indicated on X- and Y-axes and the displacement vectors are preset as data in memory means and the auxiliary machining movement is carried out according to the displacement vectors preset in the memory means.

The foregoing object and other objects of the invention are met by the provision of an electrical discharge machine in which electric current is applied to an electrode and a workpiece with a machining liquid filling the gap between the electrode and the workpiece, a main machining movement in a main machining direction and an auxiliary machining movement in a plane perpendicular to the main machining direction are effected for the electrode and the workpiece, and the gap between the electrode and the workpiece is controlled to maintain a preferred electrical discharge maintaining gap and further including input means having display means in which the auxiliary machining movement plane is displayed on an X- and Y-axes and instruction means for instructing an auxiliary machining movement process in which a desired displacement vector is described on a movement plane displayed on the display means to move the workpiece with respect to the electrode thereby to machine a desired part of the workpiece, and memory means for presetting as data an auxiliary machining process according to the data preset in the memory means.

DESCRIPTION OF THE PREFERRED EMBODIMENTS

A preferred embodiment of an electrical discharge machine constructed according to the present invention will be described with reference to FIGS. 7 through 10.

Figure 7:
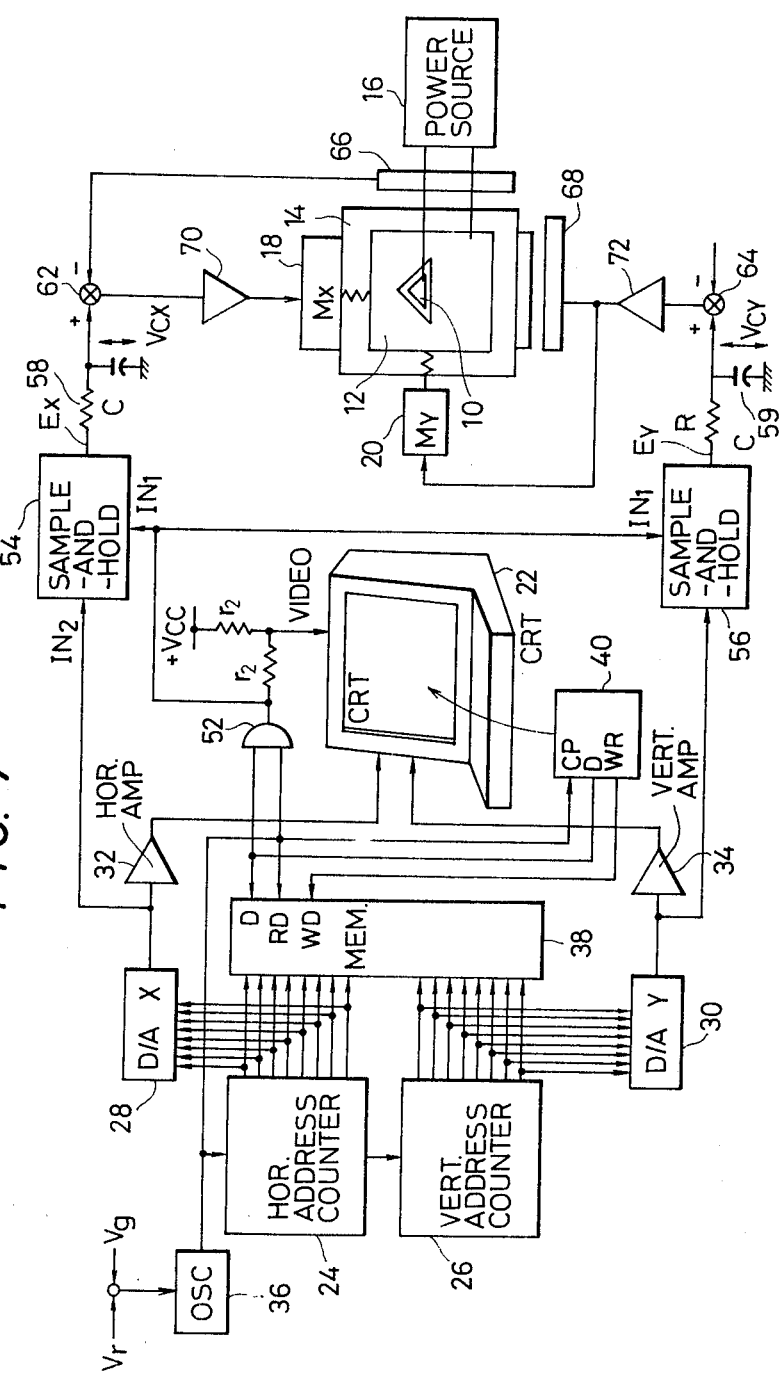
FIG. 7 is a block diagram showing a preferred embodiment of an electrical discharge machine constructed according to the invention.

A first embodiment of an electrical discharge machine of the invention is shown in FIG. 7. An electrode 10 is arranged confronting a workpiece 12 which is fixedly mounted on a table 14. The electrode 10 is fed or moved in the Z or main machining direction. An electric source 16 applies a pulsive discharge machining voltage Vg to the electrode 10 and the workpiece 12 to carry out an electrical discharge machining operation in the gap between the electrode 10 and the workpiece 12. The table 14 is provided with an X-axis drive motor 18 and a Y-axis drive motor 20 so that the workpiece 12 can be moved relative to the electrode to perform auxiliary machining movement by supplying vector machining drive signals to the motors 18 and 20.

A cathode-ray tube 22 serves as a display device which receives the outputs of address counters 24 and 26 through digital-to-analog (D/A) converters 28 and 30 and amplifiers 32 and 34. As a result, an electron beam is scanned in horizontal and vertical directions upon the cathode-ray tube 2 so that the relative positions of the electrode 10 and the workpiece 12 are displayed on an X-Y coordinate plot. The address counter 24 determines a scanning line position in the horizontal axis direction. To do this, the address counter counts the output clock pulses of an oscillator 36 up to a maximum value Nx corresponding to the number of picture elements on the horizontal axis of the cathode-ray tube 22. On the other hand, the address counter 26 is adapted to determine a scanning line position in the vertical axis direction of the cathode-ray tube 22. The address counter 26 is cascade-connected to the address counter 24 so that it advances by a count of one whenever the counter 24 counts up to Nx. The counter 26 counts up to a maximum value Ny corresponding to the number of horizontal scanning lines. Nx×Ny clock pulses are necessary to display one frame of data on the cathode-ray tube 22.

Since the counters 24 and 26 repeatedly carry out their counting operations as 0, 1, 2, ... and Nx, and 0, 1, 2 ... and Ny, respectively, it is necessary to set the refresh period for the display at about 50 msec in order to prevent flicker of a displayed image on the cathode-ray tube 22. Accordingly, the frequency of clock pulses outputted by the oscillator 36 should be at least (1000/50)×Nx×Ny Hz.

In FIG. 7, reference numeral 38 designates a digital memory or a memory unit. When a high level signal is applied to the write terminal WD of the digital memory 38, data is stored therein. When a high level signal is applied to the read terminal RD of the memory 38, data is read out of the memory 38.

Figure 1:
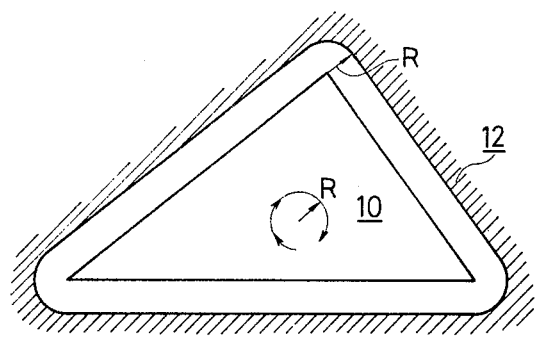
FIGS. 1 through 3 are explanatory diagrams for a description of a conventional auxiliary machining movement method.
Figure 2:
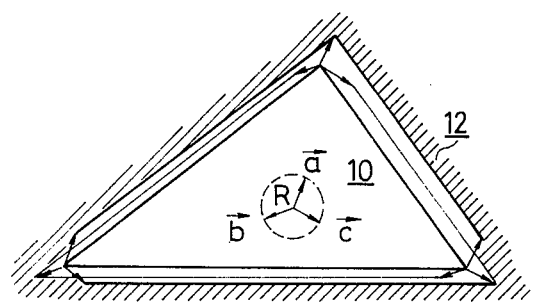
Figure 3:
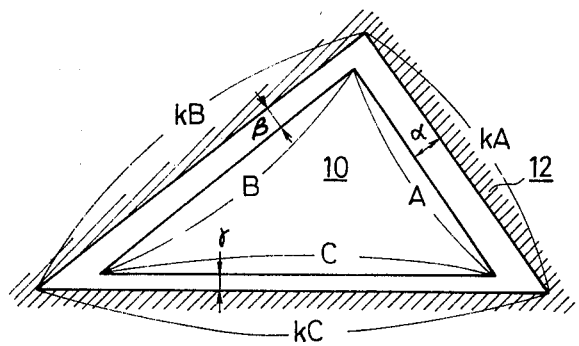
Figure 4:
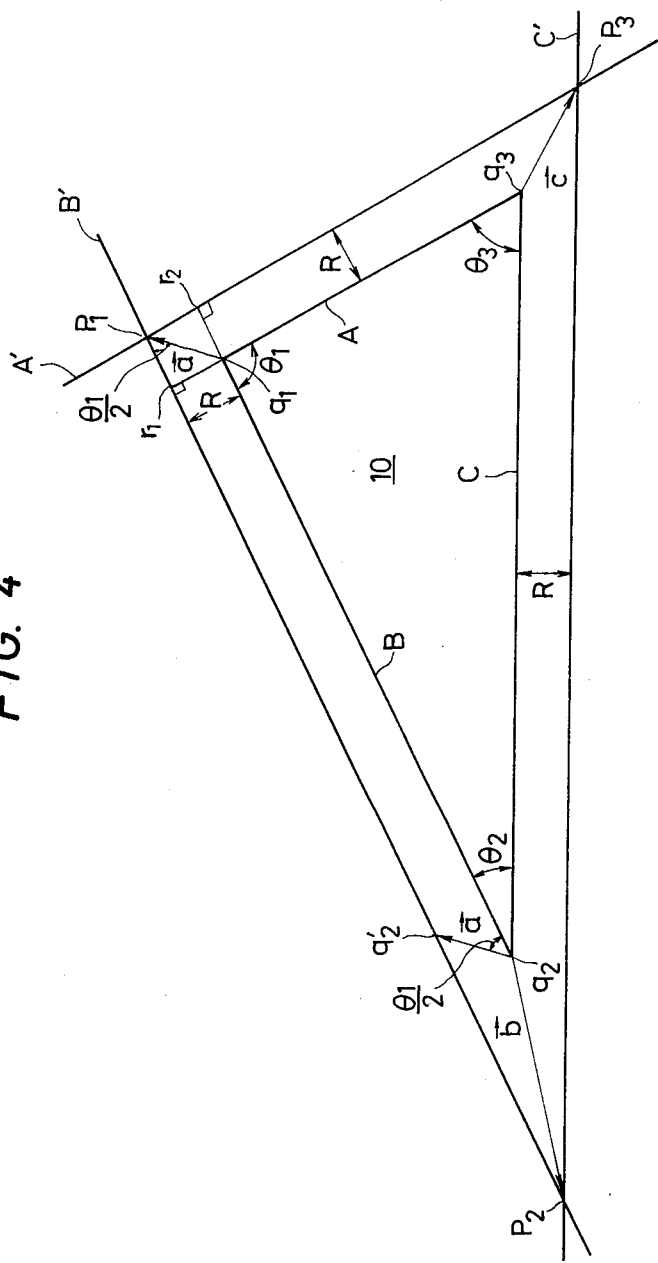
FIGS. 4 through 6 are explanatory diagrams for a description of an improved auxiliary machining feeding method of the prior art.
Figure 5:
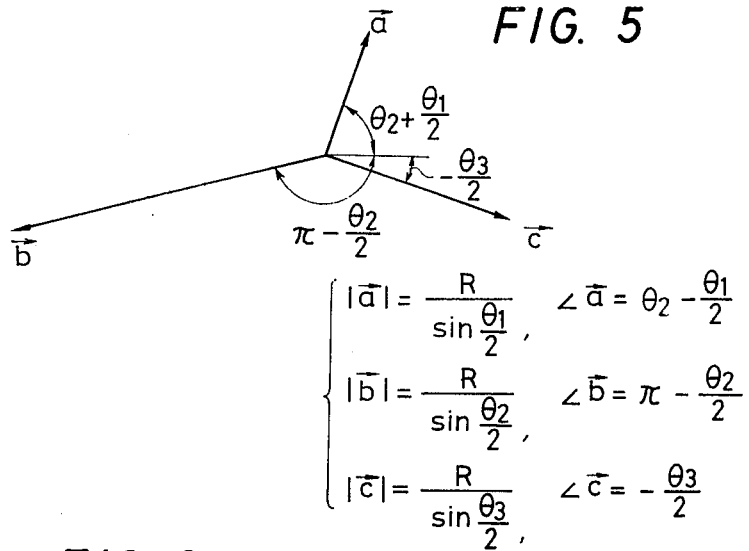
Figure 6:
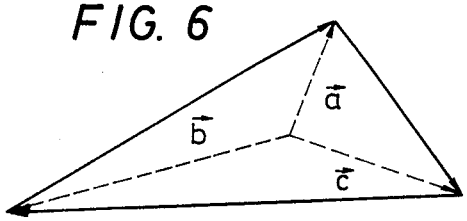
Figure 8:
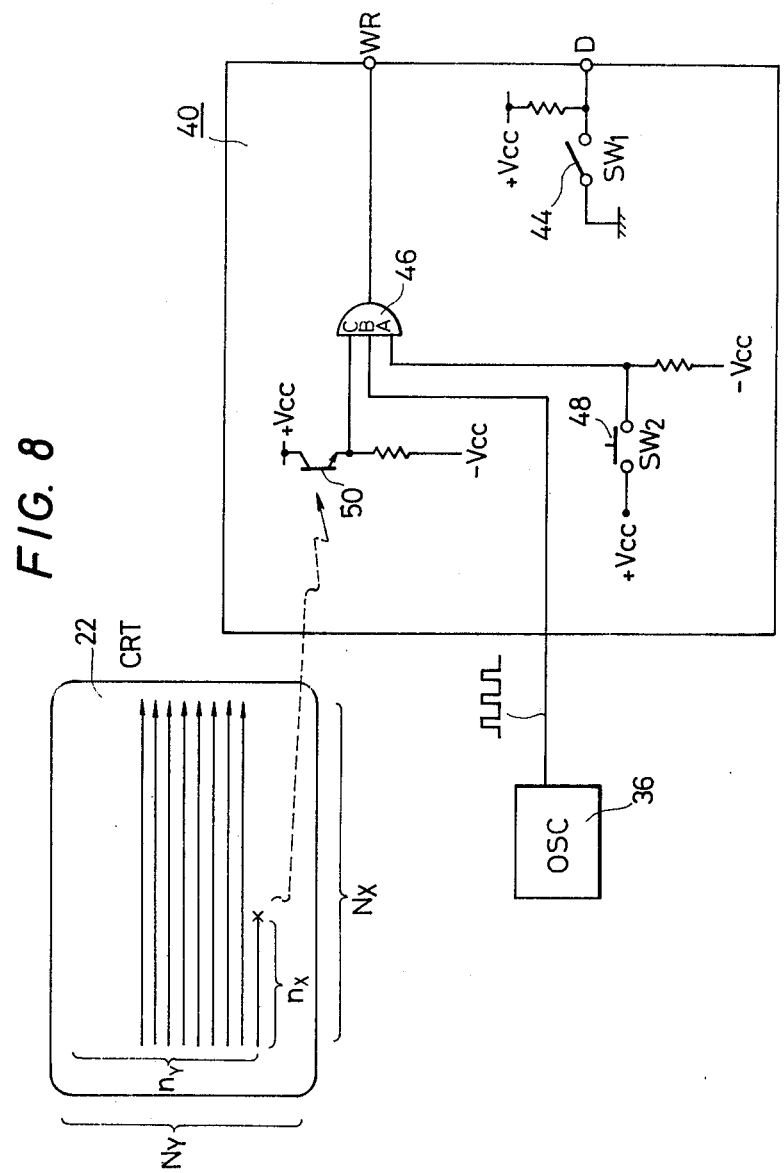
FIG. 8 is a circuit diagram showing a part of the machine in FIG. 7.

Further in FIG. 7, reference numeral 40 designates indicating means, specifically a light pen, the circuitry of which is shown in FIG. 8. The light pen 40 has a terminal WR connected to the terminal WD of the memory 38 and a terminal D connected to the terminal D of the memory 38. The terminal D of the light pen 40 is connected through a resistor to an electric source +Vcc and is grounded through a switch SW1 44. The terminal WR of the light pen 40 is connected to the output terminal of an AND gate 46 which receives as inputs thereto three signals A, B and C. The signal A is raised to a logical high level "H" only when a switch SW2 48 is turned on. The signal B is raised to "H" whenever the oscillator 36 provides its output clock pulse. The signal C is raised to "H" only when a phototransistor 50 provided at the end of the pen 40 is rendered conductive. Accordingly, when the point of the pen 40 is held adjacent a given point on the scream of the cathode-ray tube 22 with the switch 48 turned on, the phototransistor 50 is periodically rendered conductive by the scanning beam which passes through the point periodically as a result of which the "H" signal is provided at the terminal WR in synchronization with the conduction of the phototransistor 50. If, in this operation, the switch 44 is turned off, the X,Y address on the cathode-ray tube of the point at which the pen 40 is held is written in an address in the memory. In the same manner, the addresses of designated points, such as the points defining the displacement vector $\vec{a}$ in FIG. 4, are successively stored in the memory 38 by plotting them with the pen. The data thus written in the memory can be erased by plotting the points to be erased with the pen after the switch 44 has been turned off.

An AND gate 52 is provided for switching the brightness of the cathode-ray tube 22. The brightness of a displayed image on the cathode-ray tube 22 is determined by a brightness voltage which is applied to a luminance signal input terminal (VIDEO). When the AND gate 52 is in the "off" or closed state, the brightness voltage is low, $r_2/(r_2+r_2) \cdot V_{cc} = \frac{1}{2} V_{cc}$, and the brightness is low. On the other hand, when the AND gate is in the "on" or open state, the brightness voltage is high and the brightness is high. At such times, the "H" signal is present at the terminal D of the memory 38 when the scanning line of the cathode-ray tube 22 passes through a point on the tube 22 whose address has been stored therein by placing the pen against the screen of the position of that point. This "H" signal opens the AND gate 52 with the aid of the clock pulse outputted by the oscillator 36 and therefore the corresponding point on the cathode-ray tube 22 is brightened.

The electrical discharge machine further includes an X-axis sample-and-hold circuit 54 and a Y-axis sample-and-hold circuit 56. Only when the AND gate 52 is open are the gates of the sample-and-hold circuits 54 and 56 opened so that the circuits 54 and 56 hold and output voltages Ex and Ey which correspond to the X and Y coordinates outputted by the D/A converters 28 and 30, respectively. The voltages Ex and Ey are held until the AND gate 52 is opened again. The voltages Ex and Ey outputted by the sample-and-hold circuits 54 and 56 are converted into voltages Vcx and Vcy by primary delay systems 58 and 59 each composed of a resistor R and a capacitor C. The voltages Vcx and Vcy are applied to addition points 62 and 64, respectively. The voltages Vcx and Vcy can be represented by the following equations:

$$Vcx = Ex_0 + (Ex_1 - Ex_0)\left(1 - \exp\left(-\frac{t}{RC}\right)\right) \quad (1)$$

$$Vcy = Ey_0 + (Ey_1 - Ey_0)\left(1 - \exp\left(-\frac{t}{RC}\right)\right) \quad (2)$$

where $Ex_0$ and $Ey_0$ are the voltages provided before the gates of the sample-and-hold circuits 54 and 56 are opened, $Ex_1$ and $Ey_1$ are the voltages which are newly held when the gates are opened, and t is the time which elapses after the opening of the gates.

As may be seen from these equations, the variational components of the voltages Vcx and Vcy are each the product of a voltage and a function which varies only with time, that is $f(t)=1-\exp(-1/RC)$, and the time dependency of the two equations is the same. Thus, the voltages Vcx and Vcy increases or decreases in a completely linear manner with respect to each other.

Position detectors 66 and 68 are provided for converting the relative positions of the electrode 10 and the workpiece 12 in the X and Y directions into analog voltages Vx and Vy which are applied to the addition points 62 and 64, respectively. The position detectors are constituted, for instance, by differential transformers.

At the addition points 62 and 64, the detection output voltages of the position detectors 66 and 68 are compared with the output voltages Vcx and Vcy of the sample-and-hold circuits 54 and 56 and the resultant difference components are applied through amplifiers 70 and 72 to the motors 18 and 20, respectively. Thus, the motors 18 and 20 are driven according to the stored points, namely the displacement vectors stored in the memory 38.

With the electrical discharge machine constructed as described above, to carry out an auxiliary machining movement operation, for instance, in accordance with the displacement vector $\vec{a}$, the points defining the vector $\vec{a}$ are plotted with the pen 40 on the cathode-ray tube 22. In this operation, the switches 44 and 48 of the pen 40 should be turned off and on, respectively.

In the described manner, the points defining the vector $\vec{a}$ are stored in the form of data in memory 38. Accordingly, whenever the scanning line passes through a designated point on the cathode-ray tube 22, the memory 38 outputs the "H" signal at the terminal D in synchronization with the clock pulse from the oscillator 36 to thereby open the AND gate 52. As was described above, when the AND gate 52 is opened, the brightness of the scanning beam on the cathode-ray tube 22 is increased and the gates of the sample-and-hold circuits 54 and 56 are opened. Therefore, the point stored in the memory is visibly brightened on the cathode-ray tube 22 and the voltages Ex and Ey corresponding to the X and Y coordinates of the point are held by the sample-and-hold circuits 54 and 56. At the addition points 62 and 64, the output voltages Vcx and Vcy from the sample-and-hold circuits 54 and 56 are compared with the detection voltages from the position detectors 66 and 68 and the resultant difference components are applied through the amplifiers 70 and 72 to the motors 18 and 20 to drive the motors. Since, in this case, the voltages Vcx and Vcy increase or decrease in a completely linear relationship with respect to one another as described above, the relative movement of the electrode 10 and the workpiece 12 which is effected by driving the motors 18 and 20 is carried out in a linear manner with respect to the displacement vector $\vec{a}$.

The relative feeding speed mentioned above can be changed as desired by varying the clock pulse frequency of the oscillator 36. Therefore, if the electrical discharge machine is so designed that the clock pulse frequency is controlled by the difference between the function of the machining gap between the electrode 10 and the workpiece 12, which may be accomplished by forming the difference between the average machining voltage Vg and a reference voltage Vr, an intricate locus can be traced with the machining gap maintained unchanged.

Figure 9:
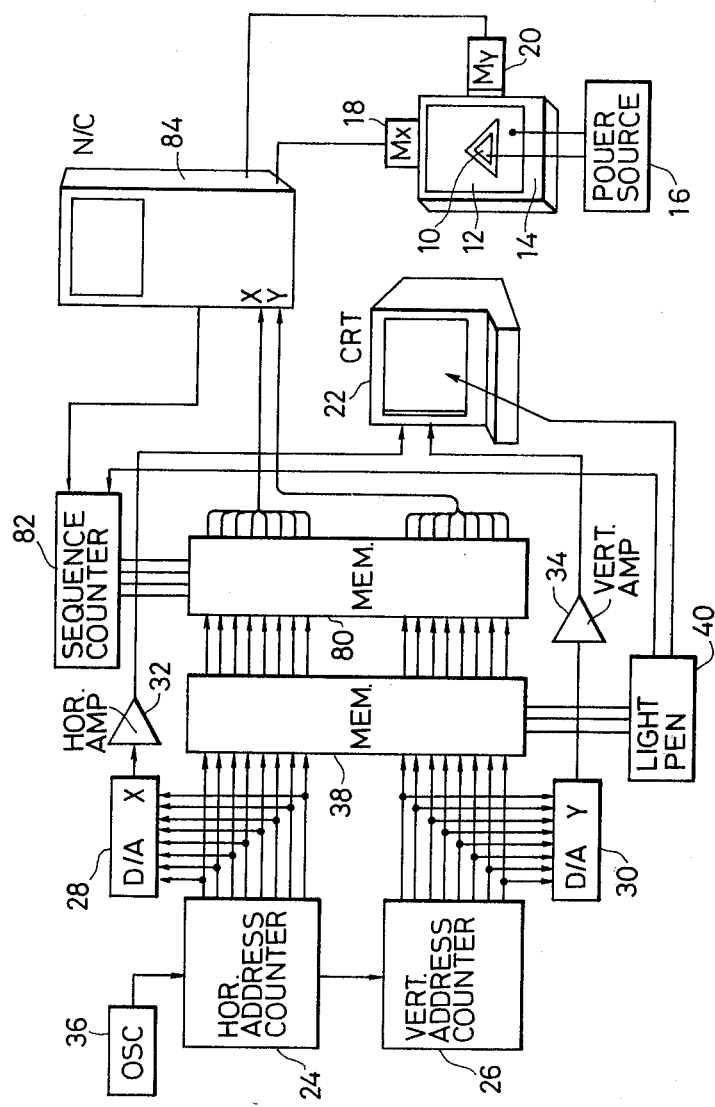
FIG. 9 is a block diagram showing a second preferred embodiment of an electrical discharge machine constructed according to the invention.

Another example of an electrical discharge machine of the invention is shown in FIG. 9. In this embodiment, the output of a memory 38 is connected to a digital memory 80. X,Y addresses stored in the memory 38 are stored in the memory 80 and the address data in the memory 80 is applied to an N/C 84 in response to an instruction signal from a sequence counter 82 which is provided independently. According to data outputted by the memory 80, a numerical controller 84 moves the relative positions of an electrode 10 and a workpiece 12 and, whenever the relative positions are changed, drives the sequence counter 82 to cause the memory 80 to output the next data in response to which the relative positions are again moved. In this manner, the controller 84 continuously carries out the displacement. Therefore, if a polygonal locus composed of plural displacement vectors is described on the cathode-ray tube 22 and is stored as data in the memories 38 and 80, the continuous displacement operations can be automatically carried out by the electrical discharge machine.

In the above-described examples, a cathode-ray tube is employed as a display device. However, any display device can be employed if it can display the auxiliary machining feeding surface on X and Y axes. For instance, a plasma display panel or a display device having a display surface in the form of an X-Y matrix may be employed.

Figure 10:
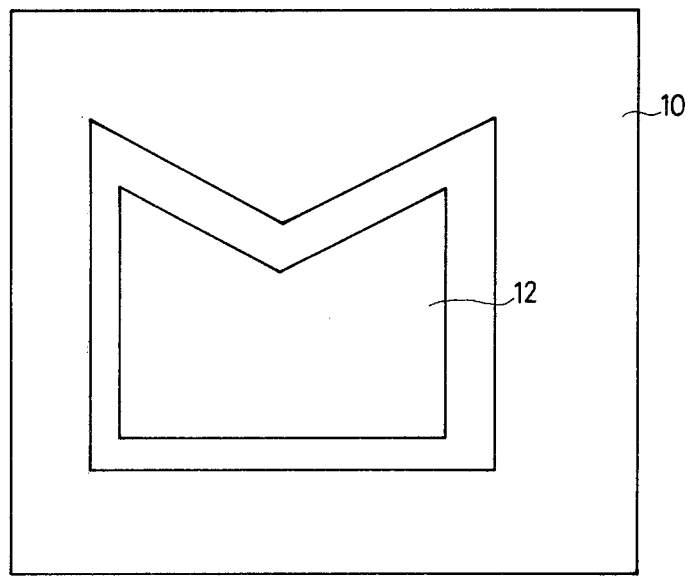
FIG. 10 is a plan view showing an example of an electrode employable with the invention.

Furthermore, in the above-described example, the electrode is described as being triangular in section. However, the invention is not limited thereto or thereby. That is, an electrode having an intricate, polygonal configuration as shown in FIG. 10 may be effectively employed in the auxiliary machining movement operation.

As is clear from the above description, according to the invention, the displacement vector is displayed on a display unit in which the auxiliary machining movement surface for the electrode and the workpiece is displayed on X and Y axes and the displacement vector is preset as data in the memory means with the auxiliary machining moving operation carried out according to the displacement vector thus preset. Therefore, even with an electrode of relatively intricate configuration, the auxiliary machining movement operation can be achieved with a relatively simple arrangement by a visually simple operation. Thus, the electrical discharge machine according to the invention is considerably practical in operation.

Figure 11:
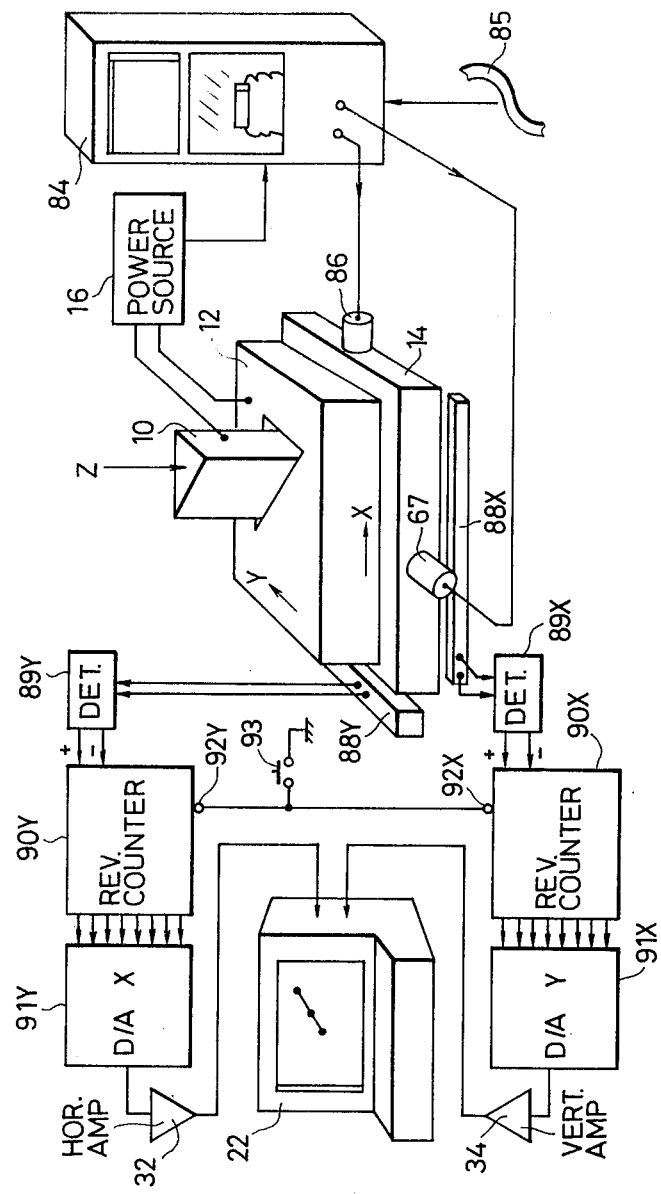
FIGS. 11 and 12 are block schematic diagrams of third and fourth embodiments of an electrical discharge machine constructed according to the invention.

Another preferred embodiment of an electrical discharge machining control device constructed according to the invention will be described with reference to FIG. 11 in the accompanying drawing. In FIG. 11, an electrode 10 is moved relative to a workpiece 12 in a main direction or in the direction of an axis Z while a discharge voltage is being applied from an electric workpiece 12 is further machined by displacing the electrode 10 relative to the workpiece 12 in the X–Y plane. The relative displacement in the X–Y plane is carried out, for instance, by moving a table 14 on which the workpiece 12 is placed along a locus which has been programmed on a paper tape 80 by an N/C device 84 with drive motors 86 and 87. The relative displacement thus carried out is detected as two phase outputs by optical encoder detectors 88X and 88Y which are provided on the X-axis and the Y-axis, respectively. The phase outputs are converted into a pulse output in the positive direction and a pulse output in the negative direction by detectors 89X and 89Y, respectively. The pulse outputs are counted by reversible counters 90X and 90Y so that the present position in the X and Y axes are represented by the accumulated counts positions. The present positions are converted into analog voltages by D/A converters 91X and 91Y. The analog voltages are amplified by the vertical amplifier 34 and the horizontal amplifier 32 for the cathode-ray tube 22 so as to be displayed on X–Y coordinates thereon. The distance between the origin point of the relative displacement of the electrode 10 and the workpiece 12 and the maximum thereof is generally of the order of 500 $\mu$m. Therefore, the number of bits required for the reversible counters 90X and 90Y and the D/A converters 91X and 91Y is not more than ten bits. However, if it is desired that the origin point of the relative displacement be capable of being shifted, then the reversible counters 90X and 90Y may overflow or it may be impossible to locate a desired origin point on the screen of the cathode-ray tube 22. In order to overcome these difficulties, reset terminals 92X and 92Y are provided for the reversible counters 90X and 90Y, respectively, and the reversible counters are connected to be reset by operating a reset switch 93 when the electrode 10 and the workpiece 12 are at the origin point of the relative displacement so that the center of the cathode-ray tube 22 coincides with the origin point at all times. With this feature, the X–Y coordinates of the relative displacement can be set as desired on the screen of the cathode-ray tube 22. In addition, even if droop, hunting or delay occurs between the relative displacement and the instruction from the N/C device 84 because the relative displacement is effected at high speed, the actual movement can be nonetheless be accurately detected.

Furthermore, in the case where, after a workpiece has been machined with a small displacement of several hundreds of micrometers, the electrode is moved to a different position to machine the workpiece with a small displacement at the second position, then the reset terminals 92X and 92Y may be connected to be activated by the N/C device 84 so that the counters will be reset when a small displacement is imparted to the workpiece. In this case, even if the stroke of the table 14 is long, a small displacement can be observed on the screen of the cathode-ray tube 22.

Thus, according to the electrical discharge machining control device of the invention, not only small relative displacements of the electrode and the workpiece can be confirmed on the display device with the origin point of the relative displacement always coincided with the center of the display unit, but also the difference between the displacement locus instruction value and the actual movement can be visually confirmed on the display unit.

Figure 12:
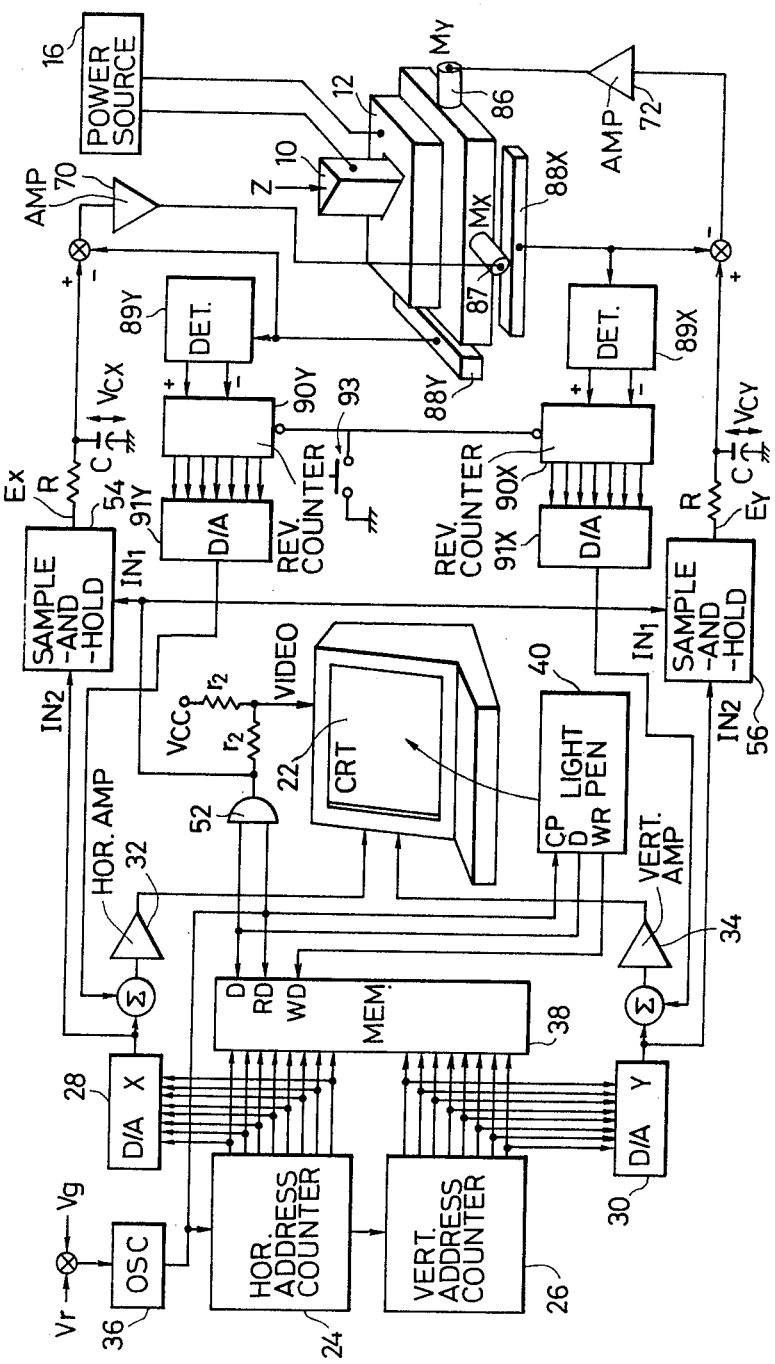

A yet further preferred embodiment of the invention is shown in the block schematic diagram of FIG. 12 in which advantageous feature of the embodiments of FIGS. 7 and 11 are combined. In FIG. 12, like reference numerals designate like components in FIGS. 7, 11 and 12. With this embodiment, the outputs of D/A converters 91X and 91Y are summed, respectively, with the outputs of D/A converters 28 and 30 then coupled to the inputs of horizontal amplifier 32 and vertical amplifier 34, respectively. The operation is the same as that for the FIGS. 7 and 11 embodiments in other respects.

What is claimed is:

1. An electrical discharge machine for machining a workpiece by applying electric current to said workpiece and an electrode with a machining liquid filling the space between said workpiece and said electrode comprising:
   main machining moving means for carrying out main machining movement to machine said workpiece in a main machining direction with said electrode confronting said workpiece;
   auxiliary machining moving means for carrying out auxiliary machining movement to machine said workpiece by moving said electrode relative to said workpiece in a plane which crosses said main machining direction;
   control means for maintaining a gap between said electrode and said workpiece at a predetermined value; and
   display means for detecting an auxiliary machining movement displacement in said plane for displaying said displacement at enlarged scale with the center of said displacement as an origin point.

2. The machine as claimed in claim 1 in which said display means comprises a cathode-ray tube.

3. The machine as claimed in claim 1 further comprising an optical encoder detector for detecting said auxiliary machining movement displacement to provide a detection signal and reversible counter means having a count input coupled to an output of said detector and an output coupled to control a displayed position on said display means.

4. The machine as claimed in claim 3 in which said reversible counter means has an input terminal to which a reset signal for setting the center of said auxiliary machining feeding displacement as an origin point is applied.

5. An electrical discharge machine for machining a workpiece by applying electric current to said workpiece and an electrode with a machining liquid filling the space between said workpiece and said electrode comprising:
   main machining moving means for carrying out main machining movement to machine said workpiece in a main machining direction with said electrode confronting said workpiece;
   auxiliary machining feeding means for carrying out auxiliary machining movement by moving said electrode relative to said workpiece in a plane which crosses said main machining direction;
   control means for maintaining a gap between said electrode and said workpiece to maintain electrical discharge in said gap;
   display means for detecting an auxiliary machining movement displacement in said plane for displaying said displacement at enlarged scale with the center of said displacement as an origin point;
   instructing means for drawing a desired displacement vector in said plane on said display means and instructing a predetermined amount of displacement with said auxiliary machining movement to subject said electrode and said workpiece to relative movement according to said displacement vector;
   memory means for presetting as data said amount of displacement in auxiliary machining movement instructed by said instructing means; and
   means for controlling said auxiliary machining moving means according to said data preset in said memory means.

6. The machine as claimed in claim 5 in which said display means comprises a cathode-ray tube and said instructing means comprises a light pen.

7. The machine as claimed in claim 6 in which said cathode-ray tube comprises means for increasing the brightness thereof in response to a clock pulse signal when an amount of displacement is instructed by said light pen.

8. The machine as claimed in claim 5 in which said means for controlling said auxiliary machining moving means comprises sample-and-hold circuit means.

9. The machine as claimed in claim 8 in which time constant circuit means are provided between said sample-and-hold circuit means and said auxiliary machining moving means.

10. An electrical discharge machine for machining a workpiece by applying electric current to said workpiece and an electrode with a machining liquid filling the space between said workpiece and said electrode comprising:

main machining moving means for carrying out main machining movement to machine said workpiece in a main machining direction with said electrode confronting said workpiece;

auxiliary machining moving means for carrying out auxiliary machining movement by moving said electrode relative to said workpiece in a plane which crosses said main machining direction;

control means for controlling a gap between said electrode and said workpiece to maintain electrical discharge in said gap;

display means for displaying information relative to said plane on an X-axis and a Y-axis;

instructing means for drawing a desired displacement vector in said plane on said display means and instructing a predetermined amount of displacement with said auxiliary machining movement to subject said electrode and said workpiece to relative movement according to said displacement vector;

memory means for presetting as data said amount of displacement in auxiliary machining movement instructed by said instructing means; and means for controlling said auxiliary machining moving means according to said data preset in said memory means.

* * * * *